(12) United States Patent
Hochmuth et al.

(10) Patent No.: US 8,762,540 B2
(45) Date of Patent: Jun. 24, 2014

(54) MANAGING MULTIPLE REMOTE COMPUTING SESSIONS DISPLAYED ON A CLIENT DEVICE

(75) Inventors: Roland Hochmuth, Fort Collins, CO (US); John Marks, Fort Collins, CO (US); Per Gullberg, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 3642 days.

(21) Appl. No.: 10/931,870

(22) Filed: Sep. 1, 2004

(65) Prior Publication Data
US 2006/0075106 A1 Apr. 6, 2006

(51) Int. Cl.
*G06F 15/16* (2006.01)
(52) U.S. Cl.
USPC .......................... 709/227; 709/229; 709/246
(58) Field of Classification Search
USPC ................ 709/226, 227, 228, 229, 223, 224
See application file for complete search history.

(56) References Cited

U.S. PATENT DOCUMENTS

| | | | | |
|---|---|---|---|---|
| 5,475,837 A * | 12/1995 | Ishak et al. | ............................ | 1/1 |
| 5,708,786 A * | 1/1998 | Teruuchi | ........................ | 715/788 |
| 6,381,605 B1 * | 4/2002 | Kothuri et al. | ......................... | 1/1 |
| 6,437,803 B1 * | 8/2002 | Panasyuk et al. | ............. | 715/733 |
| 6,529,941 B2 * | 3/2003 | Haley et al. | .................... | 709/204 |
| 7,178,109 B2 * | 2/2007 | Hewson et al. | ................ | 715/790 |
| 7,246,174 B2 * | 7/2007 | Sciandra et al. | ............... | 709/244 |
| 7,257,690 B1 * | 8/2007 | Baird | ............................ | 711/162 |
| 7,275,212 B2 * | 9/2007 | Leichtling | ..................... | 715/733 |
| 7,483,868 B2 * | 1/2009 | Meng et al. | ..................... | 706/26 |
| 7,676,583 B2 * | 3/2010 | Eaton et al. | ................... | 709/227 |
| 7,698,656 B2 * | 4/2010 | Srivastava | ..................... | 715/827 |
| 2002/0057295 A1 * | 5/2002 | Panasyuk et al. | ............. | 345/804 |
| 2003/0160816 A1 * | 8/2003 | Zoller et al. | ................... | 345/735 |
| 2004/0008249 A1 * | 1/2004 | Nelson et al. | ............. | 348/14.09 |
| 2005/0080915 A1 * | 4/2005 | Shoemaker et al. | .......... | 709/231 |
| 2005/0091359 A1 * | 4/2005 | Soin et al. | ...................... | 709/223 |
| 2005/0204026 A1 * | 9/2005 | Hoerl | ............................. | 709/223 |
| 2005/0278649 A1 * | 12/2005 | McGlennon et al. | ......... | 715/775 |
| 2005/0278650 A1 * | 12/2005 | Sims et al. | ..................... | 715/778 |
| 2005/0278654 A1 * | 12/2005 | Sims | ............................. | 715/790 |
| 2007/0266122 A1 * | 11/2007 | Einarsson et al. | ............. | 709/220 |
| 2009/0235202 A1 * | 9/2009 | Sims | ............................ | 715/789 |

* cited by examiner

Primary Examiner — Dhairya A Patel

(57) ABSTRACT

A method manages, at a client device, a plurality of remote computing sessions. The method comprises executing a session manager application on the client device. The session manager application comprises a user interface in which configuration information about the plurality of remote computing sessions is displayed. Each of the plurality of remote computing sessions is executed on at least one of a set of remote computers. The method further comprises receiving, via the user interface of the session manager application, an event associated with an operation and performing the operation on at least one of the plurality of remote computing sessions in response to receiving the event.

38 Claims, 7 Drawing Sheets

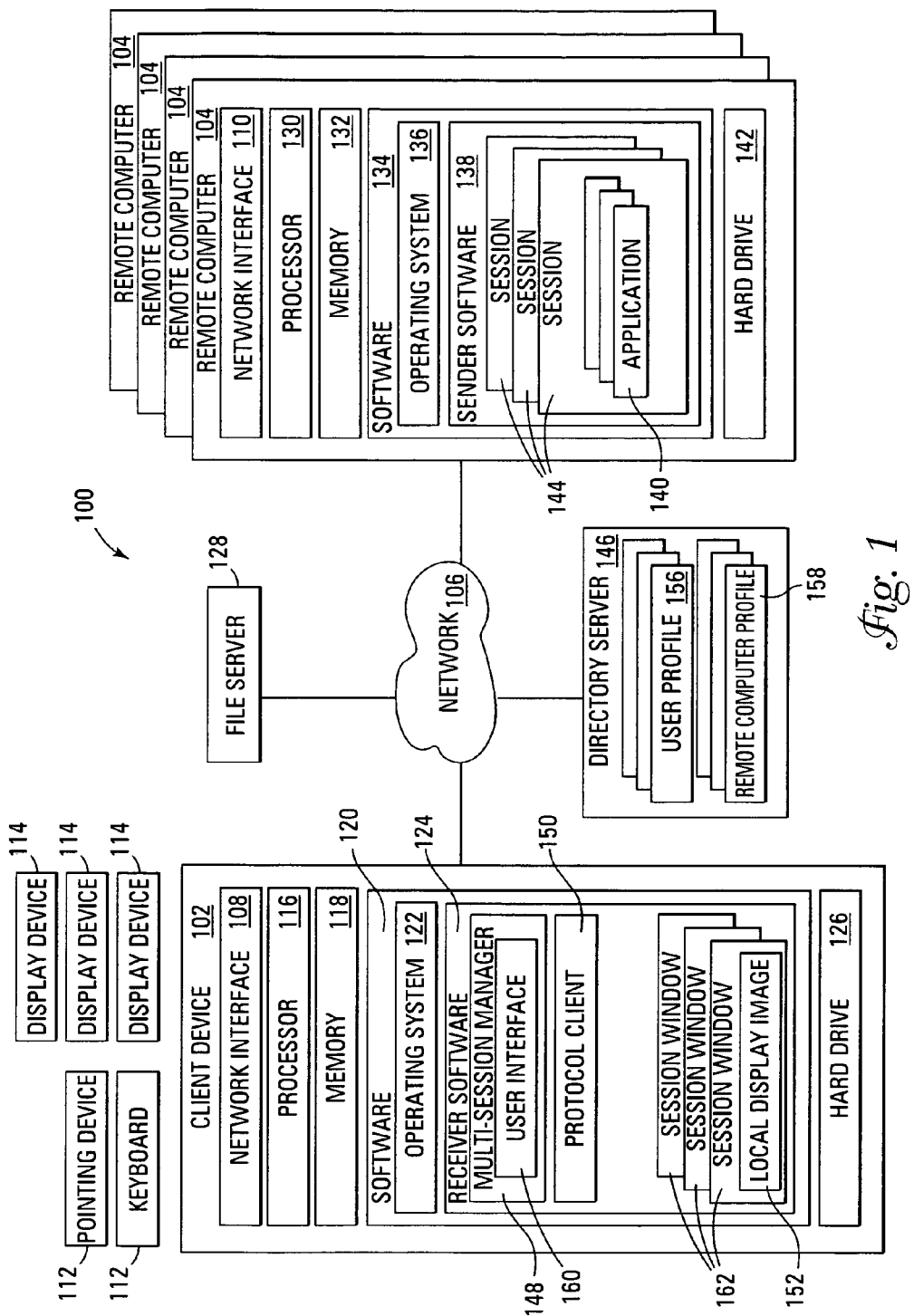

MANAGING MULTIPLE REMOTE COMPUTING SESSIONS DISPLAYED ON A CLIENT DEVICE

TECHNICAL FIELD

The following description relates to computers in general and to remote computing in particular.

BACKGROUND

In some situations, a user interacts with multiple computers in order to perform a particular task. In one example, a system administrator interacts with multiple server computers in order to monitor the status of and/or configure each of the server computers. In another example, a financial trader interacts with multiple computers on which various types of financial software are executed.

One way to provide a user with access to multiple computers involves physically locating the multiple computers within the user's workspace (for example, under or on top of a desk). In one configuration, a separate keyboard, monitor, and mouse or other pointing device is coupled to each of the multiple computers. In another configuration, a keyboard/video/mouse (KVM) switch is used to selectively couple a keyboard, video monitor, and/or mouse to the multiple computers. This enables the user to use a single keyboard, single video monitor, and/or single mouse to interact with the multiple computers. Typically, for each of the multiple computers with which a user interacts, the user must switch to that computer and manually initialize a session (for example, by logging into the computer, running one or more applications, and arranging one or more graphical user interface elements displayed by that computer).

Another way to provide a user with access to multiple computers involves physically locating the multiple computers outside of the user's immediate workspace at one or more remote locations. The user uses a client device located within the user's workspace to interact with software executing on the remote computers. The client device displays information received from the remote computers on one or more monitors coupled to the client device. The client device receives user input from a keyboard and/or mouse coupled to the client device and communicates the received input to an appropriate remote computer for processing by that remote computer. Such an approach is also referred to here as "remote computing." Using such a remote computing approach can reduce costs associated with providing multiple users with access to the same types of software (for example, due to resource sharing and centralizing system administration). Typically, when such a remote computing approach is used, each user must manually initialize a separate session to each of the multiple remote computers with which that user interacts.

SUMMARY

In one embodiment, a method manages, at a client device, a plurality of remote computing sessions. The method comprises executing a session manager application on the client device. The session manager application comprises a user interface in which configuration information about the plurality of remote computing sessions is displayed. Each of the plurality of remote computing sessions is executed on at least one of a set of remote computers. The method further comprises receiving, via the user interface of the session manager application, an event associated with an operation and performing the operation on at least one of the plurality of remote computing sessions in response to receiving the event.

In another embodiment, a computer program product comprises a session manager application. The session manager application comprises program instructions embodied on a computer-readable medium operable to cause a programmable processor of a client device to display a user interface for the session manager application and open a plurality of remote computing sessions in response to an event received via the user interface of the session manger application. A session window is generated for each of the plurality of remote computing sessions. The program instructions embodied on a computer-readable medium are further operable to cause the programmable processor of the client device to arrange the session window for each of the plurality of remote computing sessions for display by the client device and display status information about the plurality of remote computing sessions in the user interface of the session manager application.

In another embodiment, a device comprises session manager software that is executable on a programmable processor and memory communicatively coupled to the programmable processor for use by the programmable processor during execution of the session manager software. The session manager software is operable to open a plurality of remote computing sessions in response to receiving a unit of user input via a user interface displayed for the session manager software. Each of the plurality of remote computing sessions is opened on at least one of a set of remote computers. The session manager software is further operable to control via the user interface of the session manager software each of the plurality of remote computing sessions after being opened.

The details of various embodiments of the claimed invention are set forth in the accompanying drawings and the description below. Other features and advantages will become apparent from the description, the drawings, and the claims.

DRAWINGS

FIG. 1 is a block diagram of one embodiment of a remote computing system.

Like reference numbers and designations in the various drawings indicate like elements.

DETAILED DESCRIPTION

Figure 2A:
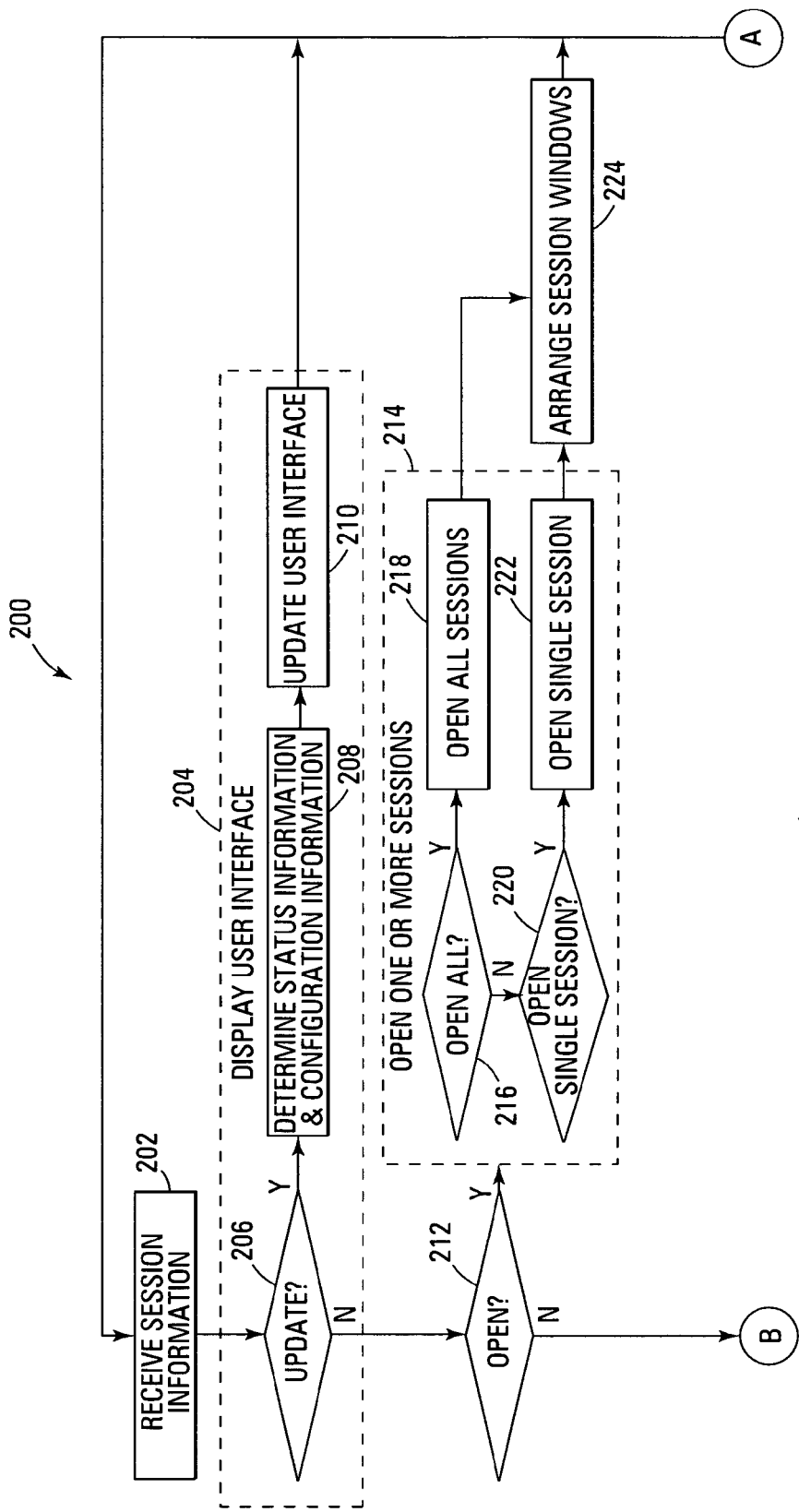
FIGS. 2A-2B is a flow diagram of one embodiment of a method of managing multiple remote computing sessions displayed on a client device.

FIG. 1 is a block diagram of one embodiment of a remote computing system 100. In the embodiment shown in FIG. 1, the system 100 comprises a client device 102 and multiple remote computers 104. A network 106 communicatively couples the client device 102 and the remote computers 104 to one another. In one embodiment, the network 106 comprises a local area network (LAN). In one implementation of such an embodiment, the LAN comprises a wired LAN supporting an ETHERNET networking protocol. In another implementation of such an embodiment, the LAN comprises a wireless LAN supporting one of the Institute for Electrical and Electronics Engineers (IEEE) 802.11 family of wireless networking standards. In other embodiments, the network 106 comprises, in addition to or instead of a wired LAN and/or a wireless LAN, other types of networks such as a wide area network (for example, the Internet) and/or a virtual private network (VPN).

The client device 102 includes a network interface 108 and each of the remote computers 104 includes a network interface 110. Each of the network interfaces 108 and 110 comprises appropriate networking interface components (for example, network interface cards, wireless transceivers, and/or modems) for communicatively coupling the client device 102 and the remote computers 104, respectively, to the network 106. For example, in one embodiment where the network 106 is implemented as a wired LAN supporting an ETHERNET networking protocol, each of the network interfaces 108 and 110 are implemented using ETHERNET network interface cards.

One or more input devices 112 for receiving input from a user of the client device 102 are communicatively coupled to the client device 102. In the embodiment shown in FIG. 1, the input devices 112 comprise a keyboard and a pointing device (such as a mouse or trackball). At least one display device 114 (such as a computer monitor) is communicatively coupled to the client device 102. In the embodiment shown in FIG. 1, three display devices 114 are coupled to the client device 102. In other embodiments, other numbers of display devices 114 are coupled to the client device 102.

The client device 102 also includes at least one programmable processor 116 and memory 118 in which software 120 executed by the programmable processor 116 and related data structures are stored during execution. Memory 118 comprises any suitable memory now known or later developed such as, for example, random access memory (RAM), read only memory (ROM), and/or registers within the processor 116. In one implementation, the processor 116 comprises a microprocessor. The software 120 executing on the processor 116 performs at least some of the processing described here as being performed by the client device 102. In the embodiment shown in FIG. 1, the software 120 executed by the processor 116 comprises an operating system 122 and receiver remote computing software 124 (also referred to here as the "receiver software 124").

The software 120 executed by the processor 116 of the client device 102 comprises appropriate program instructions that implement the functionality to be performed by the software 120. The program instructions for such software 120 are stored on or in a computer-readable medium. In the embodiment shown in FIG. 1, the computer-readable medium comprises a local hard drive 126. During operation, the processor 116 reads the program instructions from the hard disk 126 and executes the program instructions.

In some embodiments, at least a portion of the software that executes on the processor 116 is stored on different types of computer-readable media such as a flash disk, ROM, or removable media such as a floppy drive or a CD-ROM. In other embodiments, the computer-readable media is not local to the client device 102. For example in one such embodiment, at least a portion of the software that is executed on the client device 102 is stored on a file server 128 that is coupled to the client device 102 over, for example, the network 106. In such an embodiment, the client device 102 retrieves such software from the file server 128 over the network 106 in order to execute the software. In other embodiments, such software is delivered to the client device 102 for execution thereon in other ways. For example, in one such other embodiment, such software is implemented as a servelet (for example, in the JAVA programming language) that is downloaded from a hypertext transfer protocol (HTTP) server and executed by the client device 102 using an Internet browser running on the client device 102.

The various components of the client device 102 are communicatively coupled to one another as needed using appropriate interfaces, for example, buses, ports, and the like. In one implementation of the client device 102 shown in FIG. 1, the client device 102 is implemented as a "thin client" that is designed primarily to use and interact with software executing on the remote computers 104. In another implementation, the client device 102 is implemented as a "thick client" using a personal computer or workstation that is capable of running various types of software locally in addition to using and interacting with software executing on the remote computers 104.

Each remote computer 104 comprises at least one programmable processor 130 and memory 132 in which software 134 executed by the programmable processor 130 and related data structures are stored during execution. Memory 132 comprises any suitable memory now known or later developed such as, for example, RAM, ROM, and/or registers within the processor 130. In one implementation, the processor 130 comprises a microprocessor. Software 134 executing on the processor 130 of each remote computer 104 performs at least some of the processing described here as being performed by that remote computer 104. In the embodiment shown in FIG. 1, the software 134 executed by the processor 130 of each remote computer 104 comprises an operating system 136, sender remote computing software 138 (also referred to here as "sender software 138") and application software 140.

The software 134 executed by each processor 130 comprises appropriate program instructions that implement the functionality to be performed by the software 134. The program instructions for such software 134 are stored on or in a computer-readable medium. In the embodiment shown in FIG. 1, the computer-readable medium comprises a local hard drive 142 in each remote computer 104. During operation, the processor 130 of each remote computer 104 reads the program instructions from the hard disk 142 and executes the program instructions.

In some embodiments, at least a portion of the software that executes on the processor 130 of each remote computer 104 is stored on different types of computer-readable media such as a flash disk, ROM, or removable media such as a floppy drive or a CD-ROM. In other embodiments, the computer-readable media is not local to each remote computer 104. For example in one such embodiment, at least a portion of the software that is executed on each remote computer 104 is stored on the file server 128 that is coupled to that remote computer 104 over, for example, the network 106.

The various components of each remote computer 104 are communicatively coupled to one another as needed using appropriate interfaces, for example, buses, ports, and the like. In one implementation of the embodiment shown in FIG. 1, each remote computer 104 is packaged in a blade configuration suitable for mounting in a rack.

In the embodiment shown in FIG. 1, the system 100 also comprises a directory server 146 in which various information related to the system 100 is stored. For example, in one implementation, the information stored in the directory server 146 comprises a profile 156 (also referred to here as a "user profile" 156) for each user that has access to the remote computers 104 and a profile 158 (also referred to here as a "remote computer profile" 158) for each remote computer 104 included in the system 100. In such an implementation, each user profile 156 specifies on which remote computers 104 the user is authorized to establish a session 144. In one implementation, the directory server 146 is implemented using a Lightweight Directory Access Protocol (LDAP) server. In other implementations, the directory server 146 is implemented in other ways. The client device 102 and the remote computers 104 are communicatively coupled to the directory server 146, for example, using the network 106.

In the embodiment shown in FIG. 1, the receiver software 124 comprises a multiple-session manager 148 (also referred to as the "session manager" or "session manager application" 148). The multiple-session manager 148 comprises a user interface 160 for a user of the client device 102 to configure, open, monitor and otherwise control a set of sessions 144 on one or more of the remote computers 104. The multiple-session manager 148 receives input from and displays output for the user of the client device 102 via the user interface 160. In one embodiment, the user interface 160 comprises a graphical user interface that includes one or more visual controls or widgets with which a user interacts (for example, using a pointing device such as mouse) to provide input to the multiple-session manager 148 and in which the multiple-session manager 148 displays output for the user. In another embodiment, the user interface 160 of the multiple-session manager 148 comprises a command-line interface that provides a command prompt at which the user types commands to be carried out by the multiple-session manager 148 and at which the multiple-session manager 148 prints information for the user. In another embodiment, the user interface 160 comprises both a graphical user interface and a command-line interface. In other embodiments, the user interface 160 of the multiple-session manager 148 is implemented in other ways.

The receiver software 124 also comprises one or more remote computing protocol clients 150. Each remote computing protocol client 150 (also referred to here as a "protocol client" 150) implements the functionality required for the receiver software 124 to interact with one or more sessions 144 on the remote computers 104 using a particular remote computing protocol. One example of a remote computing protocol is an image-based remote computing protocol. Other examples of remote computing protocols include the MICROSOFT Remote Desktop Protocol (RDP) protocol and the CITRIX Independent Computing Architecture (ICA) protocol. In the particular embodiment shown in FIG. 1, the receiver software 124 includes one remote computing protocol client 150. In other embodiments, other numbers or types of remote computing protocol clients 150 are used.

For each session 144 with which a protocol client 150 communicates, the protocol client 150 receives user input intended for that session 144 from one or more of the input devices 112 coupled to the client device 102 and sends the received user input to the session 144 over the network 106. Also, for each session 144 with which a protocol client 150 communicates, the protocol client 150 receives display information generated for that session 144 by the sender software 138 that executes that session 144. The protocol client 150 displays a window 162 (also referred to here as a "session window" 162) for that session 144 on one or more of the display devices 114 coupled to the client device 102 and renders a local display image 152 within the session window 162 using the display information received from the sender software 138 for that session 144.

In one implementation, each session window 162 includes appropriate user interface elements that enable the user to perform various operations on the session window 162 and the associated session 144, such as moving, resizing, minimizing, scrolling, and closing the session window 162 (and the local display image 152 displayed therein) and terminating or suspending the session 144 associated with that session window 162.

In one implementation of a remote computing protocol, the display information for a session 144, for example, comprises graphics primitives that specify particular graphical operations that are to be performed in order to generate the local display image 152 for that session 144. In such an implementation, the protocol client 150 renders the local display image 152 in the respective session window 162 by performing the graphical operations specified by the received graphics primitives. In another implementation of a remote computing protocol (also referred to here as an "image-based remote computing protocol"), the sender software 138 generates a remote display image for each session 144. In such an implementation, the display information for a session 144 comprises raster data from the remote display image generated for that session 144. The protocol client 150 renders the local display image 152 by displaying the raster data generated for that session 144 in that session's session window 162.

The sender software 138 executing on each remote computer 104 implements the functionality required for the sender software 138 to interact with the receiver software 124 executing on the client device 102 using a particular remote computing protocol. For example, the sender software 138 opens one or more sessions 144 on the remote computer 104 on which the sender software 138 executes, executes one or more applications 140 within the session 144, receives user input from the protocol client 150 executing on the client device 102, and either processes the received user input or directs the received user input to an application 140 executing within the session 144. The sender software 138 executing on each remote computer 104 also generates display information for each open session 144 and sends the generated display information to the protocol client 150 of the client device 102.

In the embodiment shown in FIG. 1, the sender software 138 executing on each remote computer 104 supports, at least, a remote computing protocol that is the same as or compatible with the remote computing protocol supported by the protocol client 150 on the client device 102.

Figure 2B:
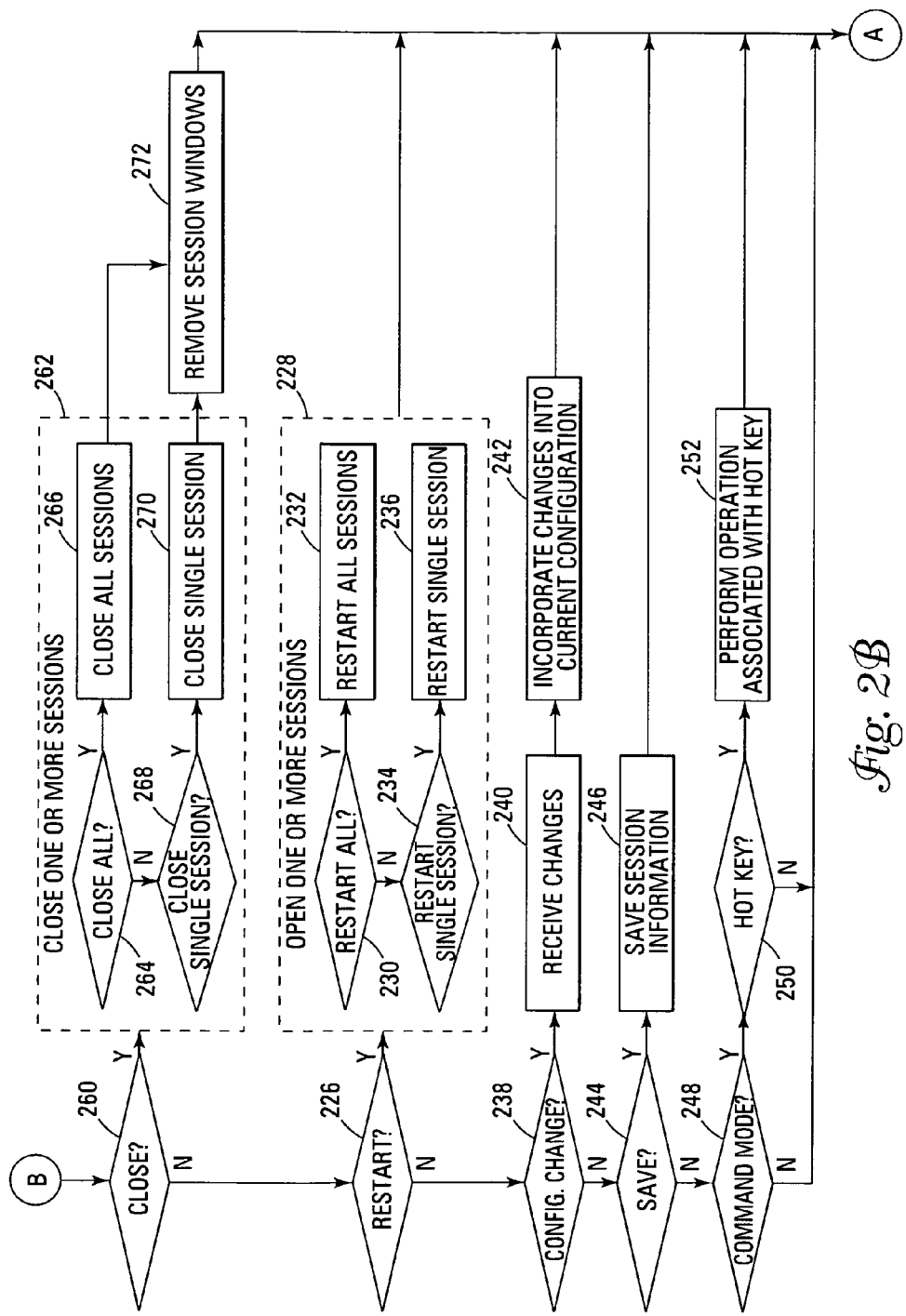

FIGS. 2A-2B is a flow diagram of one embodiment of a method 200 of managing multiple remote computing sessions displayed on a client device. The embodiment of method 200 shown in FIGS. 2A-2B is described here as being implemented using the multiple-session manager 148 shown in FIG. 1. Other embodiments are implemented in other ways, for example, using other systems that support additional or alternative remote computing protocols.

The multiple-session manager 148 receives information about a set of sessions 144 that is associated with the user (block 202 of FIG. 2A). This information is also referred to here as "session information." The set of sessions 144 associated with a user is also referred to here as the user's "session set." In one embodiment, the multiple-session manager 148 identifies the particular user of the multiple-session manager 148 (for example, by obtaining a user identifier for that user) in order retrieve the session information associated with that user. In one implementation of such an embodiment, the multiple-session manager 148 retrieves a user identifier for the user from the operating system 122 executing on the client device 102. In another implementation, the multiple-session manager 148 displays a user interface element (for example, a dialog box) in which the user enters a user identifier. In other implementations, the multiple-session manager 148 identifies the user in other ways.

In one embodiment, the session information specifies, for each session 144 included in the user session set, on which remote computer 104 the session 144 is to be opened, the user's authentication information for the session 144, a set of applications 140 to be executed within the session 144, the size and location of the session window 162 for the session 144, and other configuration information related to that session 144. In one implementation of such an embodiment, the multiple-session manager 148 receives the session information from the directory server 146. In such an implementation, the directory server 146 stores the session information for each user in that user's user profile 156. In another implementation, the session information is stored at the client device 102, for example, on the local hard drive 126 (for example, in a configuration file). In such an implementation, the multiple-session manager 148 reads the session information stored on the local hard drive 126. In other implementations, the session information is received by the multiple-session manager 148 in other ways.

In one embodiment, the user causes the multiple-session manager 148 to receive the session information, for example, by issuing a command via the user interface 160 of the multiple-session manager 148. In another embodiment, the multiple-session manager 148 receives the session information as a part of the initialization processing performed by the multiple-session manager 148 when the multiple-session manager 148 is executed. In such an embodiment, the session information for the user is retrieved by the multiple-session manager 148 without requiring the user to issue a command to retrieve the user's session information.

In one embodiment, if session information for the user does not exist, the user is prompted to create such session information. In one implementation of such an embodiment, a wizard (or other step-by-step process) is performed in order to guide the user through a process of entering information about a set of sessions 144 that the user wishes to establish on one or more of the remote computers 104. In other embodiments, an error message is displayed for the user indicating that no session information is available for the user. In such embodiments, for example, the user can manually establish a set of sessions 144 on one or more remote computers 104 (for example, by directly interacting with the protocol client 150 executing on the client device 102) and subsequently cause the multiple-session manager 148 to save the current session information associated with those session 144 (for example, as described below in connection with block 244 through block 246). In another embodiment, a system administrator creates the initial session information for the user (for example, by creating an initial user profile 156 stored in the directory server 146 that specifies the set of sessions 144 that the user is authorized to open). In such an embodiment, the user is not able to change which sessions 144 the user is able to open but is able to change other settings relating to those sessions (for example, the size and location of the session window 162 for each session 144).

Method 200 comprises displaying the user interface 160 for the multiple-session manager 148 (block 204). The user interface 160 of the multiple-session manager 148 provides a single interface by which the user is able to monitor and control the set of sessions 144. The user interface 160 comprises functionality that enables the user of the multiple-session manager 148 to open, configure, and/or restart multiple sessions 144 in response to a single command, event, or other unit of user input. One embodiment of such a user interface 160 is described below in connection with FIGS. 3A-3C.

In the embodiment shown in FIG. 2A, the user interface 160 displays information related to the current status and current configuration of the set of sessions 144 associated with the user. Information related to the current status of the set of sessions 144 is also referred to here as "status information" and information related to the current configuration of the set of sessions 144 is also referred to here as "configuration information." For example, in one implementation of such an embodiment, the status information displayed in the user interface 160 for each session 144 comprises information indicating whether the session 144 has been opened on a respective remote computer 104, the current amount of bandwidth allocated to the connection used for that session 144, and the rate at which the local display image 152 for that session 144 is updated. In such an implementation, the configuration information displayed in the user interface 160 for each session 144 comprises whether compression should be used for communicating with a remote computer 104, the quality of the local display image 152 that is to be generated for the session 144, whether a border is to be displayed around the session window 162 for that session 144, and whether the session window 162 for that session 144 should "snap" to a particular part (for example, the top, left, right, or bottom edge) of a display device. A session window 162 is said to "snap" to a particular part of a display device, when a user moves the session window 162 near that part of a display device (for example, within 10 pixels), the session window 162 is automatically aligned with that part of the display device.

In the embodiment shown in FIG. 2A, displaying the user interface 160 of the multiple-session manager 148 comprises, from time-to-time (determined in block 206), determining the current status information and current configuration information for the set of sessions 144 associated with the user (block 208) and updating the user interface 160 with the current status information and current configuration information (block 210). In one implementation of such an embodiment, the multiple-session manager 148 determines at least a part of the current status information for each session 144 by obtaining such information from the protocol client 150 on the client device 102. In such an implementation, the session information received by the multiple-session manager 148 includes initial configuration information for each session 144, at least a portion of which is displayed in the user interface 160. If the user subsequently changes any configuration information displayed in the user interface 160, the multiple-session manager 148 receives and processes such changes and updates the user interface 160 to reflect such changes to the configuration information displayed in the user interface 160 as described below connection with block 238 through block 242. In other implementations and embodiments, at least a part of the current status information and/or current configuration information for each session 144 is determined in other ways (for example, from the operating system 122 of the client device 102, from some other part of the receiver software 124, or from the sender software 138 that executes that session 144).

In one embodiment, the multiple-session manager 148 periodically determines the current status information and the current configuration information for the set of sessions 144 and updates the user interface 160. In another implementation, the multiple-session manager 148, in addition to or instead of periodically performing such processing, determines the current status and configuration information for the set of sessions 144 and updates the user interface 160 when a particular event associated with at least one of the sessions 144 occurs (for example, an event indicating that a session 144 has been opened, closed, or indicating that connectivity with the session 144 has been lost or otherwise changed) or when the user inputs a "refresh" command to the multiple-session manager 148. In other implementations, the multiple-session manager 148 determines the current status and configuration information for the set of sessions 144 and updates the user interface 160 at other times in addition to and/or instead of performing such processing periodically or in response to a particular event or command.

Method 200 also comprises, when some type of open session event occurs (checked in block 212), attempting to open one or more sessions included in the user's session set (block 214). In particular, method 200 provides a mechanism by which a user is able to cause the multiple-session manager 148 to attempt to establish multiple sessions 144 by issuing a single command or other unit of user input to the multiple-session manager 148. In the embodiment shown in FIG. 2A, if an "open-all" event has occurred (checked block 216), the multiple-session manager 148 attempts to open all of the sessions 144 included in the user's session set (if not already opened) (block 218). In the embodiment shown in FIG. 2A, if an "open-single-session" event has occurred (checked in block 220), the multiple-session manager 148 attempts to open a single session 144 associated or specified in the open-single-session event (block 222). In one implementation of such an embodiment, the user interface 160 comprises a graphical user interface in which a "connect" button is displayed for each session 144 included in the user's session set. An open-single-session event is generated when the user clicks on or otherwise actuates one of the connect buttons, which causes the multiple-session manager 148 to attempt to open the session 144 associated with that button (if not already established). In such an implementation, the user interface 160 also comprises a "connect-all" button. An open-all event is generated when the user clicks on or otherwise actuates the connect-all button, which causes the multiple-session manager 148 to attempt to open all of the sessions 144 included in the user's session set (if not already established). In other implementations, other open-all events and/or open-single session events are supported in addition to or instead of events generated in response to clicking on a connect button or on a connect-all button.

In one embodiment, the multiple-session manager 148 attempts to open each of the one or more sessions 144 by communicating with a protocol client 150 that handles that type of session 144. The multiple-session manager 148 opens each of the one or more sessions 144 using the current configuration settings for that session 144 (for example, where opened in response to an open-single-session event) or using a global configuration that is applied to each session 144 (for example, where opened in response to an open-all event). In one implementation of such an embodiment, the current configuration settings for each session 144 are the settings for that session 144 stored in the user's session profile plus any modifications made by the user (for example, as described below in connection with block 236 through block 240) since the user's session profile was last saved.

In the embodiment shown in FIG. 2A, the multiple-session manager 148 arranges the session window 162 for each established session 144 in accordance with window placement settings included in the session information for that session 144 (block 224). The window placement settings indicate, for example, on which display device or devices 114 the session window 162 for that session 144 should be displayed, where the session window 162 should be placed on the particular display device or devices 114, the size of the session window 162 when displayed, and whether the session window 162 should be minimized when initially displayed. In one implementation of such an embodiment, the window placement settings for each session 144 are saved in the user's session profile 156. In this way, each session window 162 is placed in a desired location on one or more display devices 114 without requiring the user to manually place each session window 162.

Method 200 also comprises, when some type of close session event occurs (checked in block 260 of FIG. 2B), attempting to close one or more sessions included in the user's session set (block 262). In particular, method 200 provides a mechanism by which a user is able to cause the multiple-session manager 148 to attempt to close multiple sessions 144 by issuing a single command or other unit of user input to the multiple-session manager 148. In the embodiment shown in FIG. 2B, if a "close-all" event has occurred (checked block 264), the multiple-session manager 148 attempts to close all of the sessions 144 included in the user's session set (if open) (block 266). In the embodiment shown in FIG. 2B, if a "close-single-session" event has occurred (checked in block 268), the multiple-session manager 148 attempts to close a single session 144 (if open) associated or specified in the close-single-session event (block 270). As noted above, in one implementation of such an embodiment, the user interface 160 comprises a graphical user interface in which a "connect" button is displayed for each session 144 included in the user's session set. In such an implementation, when the session associated with a connect button has been opened (for example, by clicking on the connect button), the connect button changes to a "disconnect" button (for example, the button displays the text "disconnect" instead of "connect" in the button). If the user clicks on or otherwise actuates the disconnect button, a close-single-session event is generated for that session 144. The close-single-session event causes the multiple-session manager 148 to attempt to close the session 144 associated with that button. As noted above, in such an implementation, the user interface 160 also comprises a "connect-all" button. In such an implementation, when all of the sessions in a users session set have been opened (for example, by clicking on the connect-all button), the connect-all button changes to a "disconnect-all" button (for example, the button displays the text "disconnect" instead of "connect"). If the user clicks on or otherwise actuates the disconnect-all button, a close-all event is generated. The close-all event causes the multiple-session manager 148 to attempt to close all of the sessions 144 included in the user's session set (if open). In other implementations, other close-all events and/or close-single session events are supported in addition to or instead of events generated in response to clicking on a disconnect button or on a disconnect-all button. In one embodiment, the multiple-session manager 148 attempts to close each of the one or more sessions 144 by communicating with a protocol client 150 that handles that type of session 144.

In the embodiment shown in FIG. 2B, the multiple-session manager 148 removes the session window 162 for each closed session 144 from the display device on which that session window 162 was displayed (block 272).

Method 200 also comprises, when some type of restart event occurs (checked in block 226), restarting one or more of the established sessions 144 (block 228). The multiple-session manager 148 restarts each session 144 by sending a request to the protocol client 150 that handles that session 144 to restart that session 144. The protocol client 150, in response to such a request, sends a request to the sender server 138 that is executing the session 144 requesting that the sender server 138 restart that session 144. In response to such a request, the sender software 138 restarts the session 144 (for example, by terminating the current instantiation of the session 144 and of any application software 140 executing within the session 144 and establishing a new instantiation of the session 144 and of any application software 140 that is to be executed within the session 144).

In the embodiment shown in FIG. 2B, if a "restart-all" event has occurred (checked block 230), the multiple-session manager 148 attempts to restart all of the sessions 144 included in the user's session set that are established) (block 232). In the embodiment shown in FIG. 2B, if a "restart-single-session" event has occurred (checked in block 234), the multiple-session manager 148 attempts to restart a single session 144 associated or specified in the restart-single-session event (block 236). In one implementation of such an embodiment, the user interface 160 comprises a graphical user interface in which a "restart" button is displayed for each session 144 included in the user's session set. A restart-single-session event is generated when the user clicks on or otherwise actuates one of the restart buttons, which causes the multiple-session manager 148 to attempt to restart the session 144 associated with that button. The restart button, for example, generates a restart-single-session event only when the session 144 associated with that restart button is currently opened. In such an implementation, the user interface 160 also comprises a "restart all" button. A restart-all event is generated when the user clicks on or otherwise actuates the restart-all button, which causes the multiple-session manager 148 to attempt to restart all of the currently opened sessions 144 in the user's session set. In other implementations, other restart-all events and/or restart-single session events are supported in addition to or instead of events generated in response to clicking on a restart button or on a restart-all button.

Method 200 also comprises, when a configuration change event occurs (checked in block 238), receiving one or more configuration changes (block 240) and incorporating the configuration changes into the current configuration information for the user (block 242). In the embodiment shown in FIG. 2B, the next time the user interface 160 is updated, the user interface 160 will be updated to reflect any changes to the current configuration information. In one implementation, an update event is generated when configuration information displayed in the user interface 160 has changed, which causes the user interface 160 to be updated as described above in connection with block 206 through block 210.

In the embodiment shown in FIG. 2B, if changes are made to configuration information for a currently opened session 144 (for example, by making changes to the configuration information specific to that session 144 or by making changes to global configuration information), the session 144 is not automatically re-opened using the changed configuration information. In such an embodiment, the user is able to manually re-open such a session 144 (for example, by clicking on a connect button for that session 144), which causes the multiple-session manager 148 to re-open that session 144 using the changed settings (as described above in connection with block 220 through block 224). In another embodiment, if changes are made to settings for a currently opened session 144, the session 144 is automatically re-opened by the multiple-session manager 148 using the changed settings.

Method 200 also comprises, when a save event occurs (checked in block 244), saving the current session information for the user (block 246). In one embodiment, the multiple-session manager 148 saves the session information in the user's user profile 156 stored on the directory server 146. In another embodiment, the multiple-session manager 148 saves the session information to a configuration file stored on the local hard drive 126 of the client device 102. In other embodiments, the session information is saved in other ways.

By saving the current session information (including, for example, the current configuration information and the current window placement information), the saved session information can be retrieved at a later time in order to restore the current session information. For example in one usage scenario, after the user opens all of the sessions 144 included in the user's session set, the user sizes and places the session window 162 for each session 144 on the display devices 114 coupled to the client device 102 as desired. The user is then able to save the current session information into the user's user profile 156. The next time the user executes the multiple-session manager 148, the multiple-session manager 148 retrieves the user's saved user profile 156 and opens the set of sessions 144 identified in the user profile 156 (for example, when the user clicks on a "connect all" button in the user interface 160). The multiple-session manager 148 opens the sessions 144 using the configuration information that was saved in the user profile 156 and arranges the session window 162 for each of the opened sessions 144 using the window placement information saved in the user profile 156. In this way, the user is able to restore the user's computer work environment in a convenient manner without having to manually reconfigure each session 144 and reposition each session window 162.

In the embodiment shown in FIG. 2B, the multiple-session manager 148 can be configured to receive and process one or more predetermined key sequences (also referred to here as "hot key" sequences or "hot keys"), regardless of whether the user interface 160 for the multiple-session manager 148 is currently the focus of user input. Inputting a hot key sequence is also referred to here as putting the multiple-session manager 148 in a "command mode" where input from the user is directed to the multiple-session manager instead of to the session window 162 that otherwise had the focus. When the multiple-session manager 148 is configured to enter such a command mode (checked in block 248), the multiple-session manager 148 determines when the user has input a hot key (checked in block 250). When the user enters a hot key, the multiple-session manager 148 receives the hot key (block 252) and performs a predetermined operation that is associated with that hot key (block 254). For example, in one implementation of such an embodiment, a hot key is associated with each of the local session windows 162 that are currently displayed on the display devices 114 coupled to the client device 102. If the multiple-session manager 148 is configured to receive and process hot keys (that is, the command mode is enabled), when the user inputs a hot key associated with a particular session window 162, the multiple-session manager 148 raises that session window 162 and causes that session window 162 to be the focus of user input. In this way, the user can quickly switch between multiple session windows 162 displayed on the client device 102. In other implementations, the multiple-session manager 148 processes other hot key sequences.

Figure 3A:
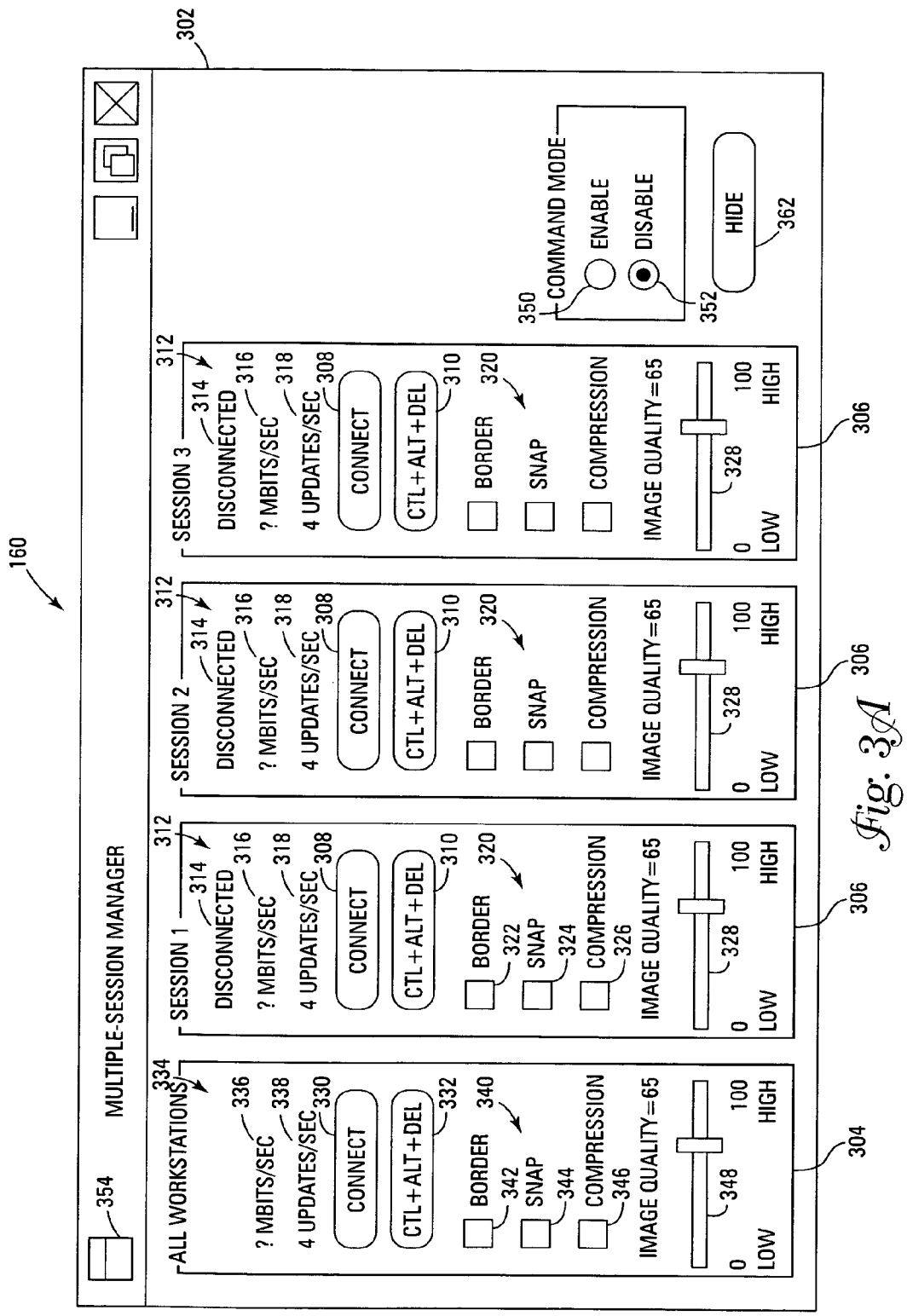
FIGS. 3A-3C illustrate one embodiment of the multiple-session manager of FIG. 1.
Figure 3B:
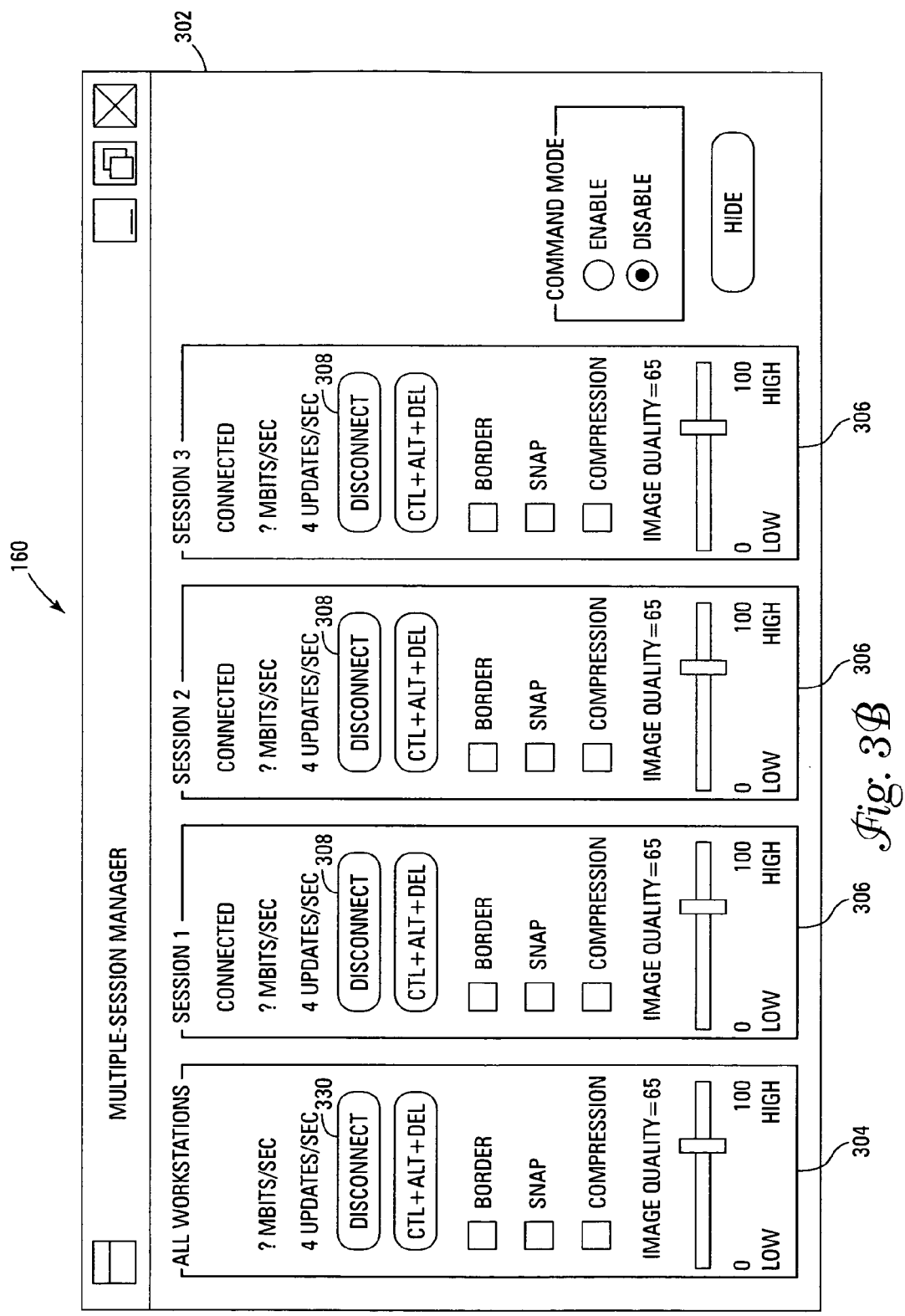
Figure 3C:
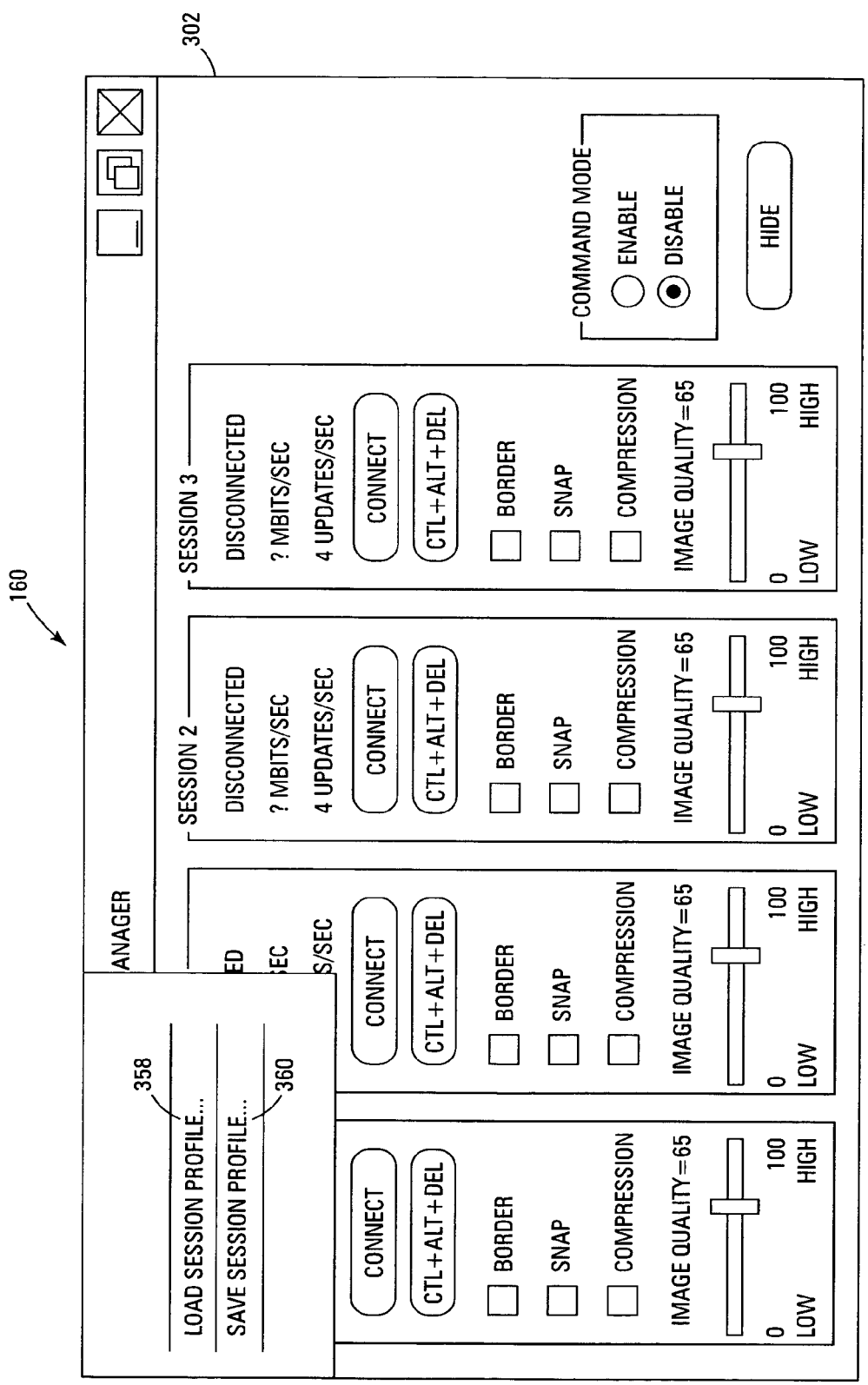
Figure 4:
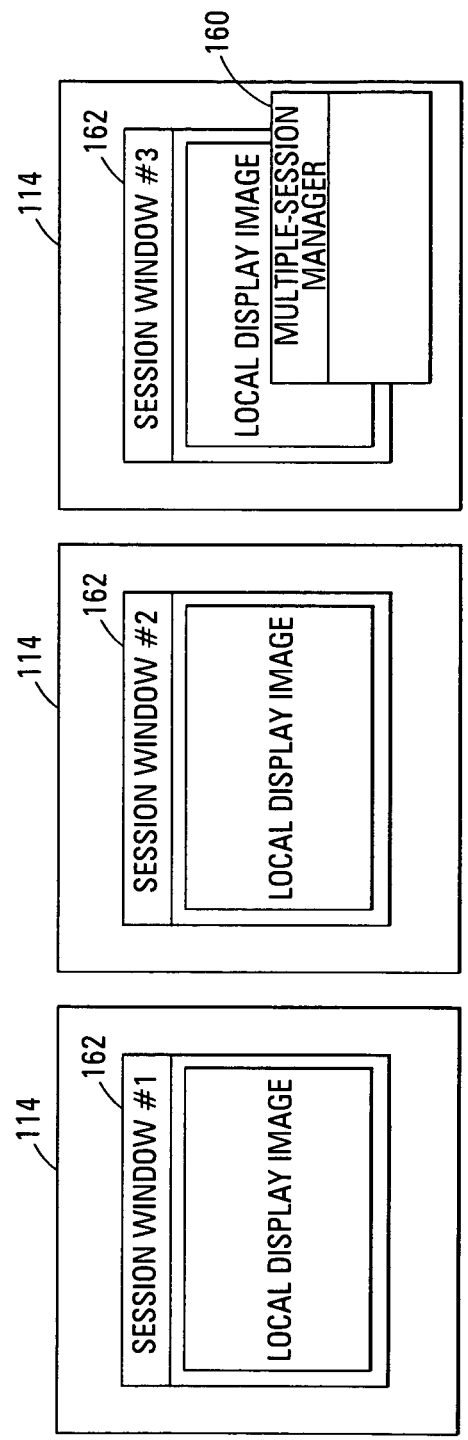
FIG. 4 illustrates one exemplary usage scenario for the embodiment of the multiple-session manager shown in FIGS. 3A-3C.

FIGS. 3A-3C illustrate one embodiment of the multiple-session manager 148 of FIG. 1. The embodiment of multiple-session manager 148 shown in FIGS. 3A-3C is described as implementing the embodiment of method 200 shown in FIGS. 2A-2B. Other embodiments of the multiple-session manager 148 and/or method 200 are implemented in other ways (for example, using different user interfaces). The user interface 160, in the embodiment shown in FIGS. 3A-3C, comprises a graphical user interface. The user interface 160 of the multiple-session manager 148 includes, as shown in FIG. 3A, a window 302 in which the various visual elements of the user interface 160 are located. The window 302 includes a global region 304 and a session-specific region 306 for each session 144 included in the user's session set. In the example shown in FIGS. 3A-3C, the user's session set includes three sessions 144. FIG. 4 illustrates one exemplary usage scenario for such an embodiment. In the example shown in FIG. 4, each of the three session windows 162 (when opened) is displayed on a different display device 114 and the user interface 160 of the multiple-session manager 148 is displayed on one of the display devices 114. It is to be understood that in other usage scenarios, a user's session set will include different numbers of sessions 144 (and, correspondingly, a different number of session windows 162) and/or the session windows 162 and the user interface 160 of the multiple-session manager 148 will be arranged differently on the display devices 114.

As shown in FIG. 3A, each session-specific region 306 includes a connect button 308 for the session 144 associated with that region 306. When the user clicks on or otherwise actuates the connect button 308 in a particular session-specific region 306, an open-single-session event is generated. When the multiple-session manager 148 processes the open-single-session event, the multiple-session manager 148 attempts to open the session 144 associated with that connect button 308 using the current configuration information for that session 144 (for example, as described above in connection with block 220 and block 222 of FIG. 2A). After the session 144 associated with that connect button 308 is opened, the session window 162 for that session 144 is arranged on a display device 114 coupled to the client device 102 in accordance with the current window placement information for that session 144. Also, as shown in FIG. 3B, after the session 144 associated with that connect button 308 has been successfully opened, the connect button 308 changes to a disconnect button 308 (for example, by changing the text displayed in the button 308 from "connect" to "disconnect"). When the user clicks on or otherwise actuates the disconnect button 308 in a particular session-specific region 306, a close-single-session event is generated. When the multiple-session manager 148 processes the close-single-session event, the multiple-session manager 148 attempts to close the session 144 associated with that connect button 308 (for example, as described above in connection with block 268 and block 270 of FIG. 2B). After the session 144 associated with that disconnect button 308 is closed, the session window 162 for that session 144 is removed from the display device 114 on which that session window 162 was displayed.

As shown in FIG. 3A, each session-specific region 306 includes a restart button 310 for the session 144 associated with that region 306. When the user clicks on or otherwise actuates the restart button 310 in a particular session-specific region 306, a restart-single-session event is generated. When the multiple-session manager 148 processes the restart-single-session event, the multiple-session manager 148 attempts to restart the session 144 associated with that restart button 310 (if the session 144 is currently open) (for example, as described above connection with block 234 and block 236 of FIG. 2B). In one implementation, the multiple-session manager 148 attempts to restart the session 144 associated with that restart button 310 by sending a "Control-Alt-Delete" key sequence (or similar event) to that remote computer 104.

Each session-specific region 306 also includes various status fields 312. In the particular embodiment of user interface 160 shown in FIGS. 3A-3C, the status fields 312 include a connection field 314 that indicates if the session 144 associated with that session-specific region 306 is currently open, a bandwidth field 316 that displays the current amount of bandwidth used by the session 144, and an update field 318 that displays the current rate at which the local display image 152 for that session 144 is updated.

Each session-specific region 306 also includes various configuration controls 320. In the particular embodiment of user interface 160 shown in FIGS. 3A-3C, the configuration controls 320 include a border checkbox 322 that specifies whether a border is to be drawn around the session window 162 for the session 144 associated with that session-specific region 306, a "snap" checkbox 324 that specifies whether the session window 162 for the session 144 should snap to a particular part of the display device, and a compression checkbox 326 that specifies whether communications for the session 144 are to be compressed. The user is able to enable each of these options by checking the respective checkbox (for example, by clicking on the checkbox when unchecked) and is able to disable each of these options by unchecking the respective checkbox (fox example, by clicking on the checkbox when checked). Also, in the particular embodiment shown in FIGS. 3A-3C, the configuration controls 320 include an image quality slider control 328 that is used to specify the quality of the local display image 152 that is generated for the session 144 associated with that session-specific region 306. The user is able to specify an image quality by positioning the slider of the image quality slider control 328 in a position that corresponds to the desired image quality.

The global region 304 includes information that relates to all of the sessions 144 included in the user's session set and includes controls by which the user is able to carry out operations on all of the sessions 144 included in the user's session set. As shown in FIG. 3A, the global region 304 includes a connect-all button 330 for the user's set of session 144. When the user clicks on or otherwise actuates the connect-all button 330, an open-all event is generated. When the multiple-session manager 148 processes the open-all event, the multiple-session manager 148 attempts to open all the sessions 144 in the user's session set using the current configuration information for each session 144 (for example, as described above in connection with block 216 and block 218 of FIG. 2A). After each session 144 is opened, the session window 162 for that session 144 is arranged on a display device 114 coupled to the client device 102 in accordance with the current window placement information for that session 144. Also, as shown in FIG. 3B, after all the sessions 144 have been successfully opened, the connect-all button 330 changes to a disconnect-all button 330 (for example, by changing the text displayed in the button 330 from "connect" to "disconnect"). When the user clicks on or otherwise actuates the disconnect-all button 330, a close-all event is generated. When the multiple-session manager 148 processes the close-all event, the multiple-session manager 148 attempts to close all of the sessions 144 in the user's session set (for example, as described above in connection with block 264 and block 266 of FIG. 2B). After each session 144 is closed, the session window 162 for that session 144 is removed from the display device 114 on which that session window 162 was displayed.

The global region 304 includes a restart-all button 332. When the user clicks on or otherwise actuates the restart-all button 332, a restart-all event is generated. When the multiple-session manager 148 processes the restart-all event, the multiple-session manager 148 attempts to restart all of the open sessions 144 included in the user's session set (for example, as described above in connection with block 230 and block 232 of FIG. 2B). In one implementation, the multiple-session manager 148 attempts to restart all of the open sessions 144 included in the user's session set by sending a "Control-Alt-Delete" key sequence (or similar event) to the remote computers 104 for those sessions 144.

The global region 304 also includes various global status fields 334. In the particular embodiment of user interface 160 shown in FIGS. 3A-3C, the global status fields 334 include a total bandwidth field 336 that displays the current total amount of bandwidth used by all of the sessions 144 in the user's set that are currently open and an average update field 338 that displays the average rate at which the local display images 152 for all open sessions 144 are updated.

The global region 304 also includes various global configuration controls 340 that a user can use to make a change to a setting that is applied to all of the sessions 144 in a user's session set. In the particular embodiment of user interface 160 shown in FIGS. 3A-3C, the global configuration controls 340 include a border checkbox 342 that specifies whether a border is to be drawn around each session window 162, a snap checkbox 344 that specifies whether each session window 162 should snap to a particular location of the display device, and a compression checkbox 346 that specifies whether communications for all sessions 144 are to be compressed. The user is able to enable each of these options for all sessions 144 included in the user's session set by checking the respective checkbox in the global region 304 (for example, by clicking on the checkbox when unchecked) and is able to disable each of these options for all sessions 144 included in the user's session set by unchecking the respective checkbox in the global region 304 (for example, by clicking on the checkbox when checked). Also, in the particular embodiment shown in FIGS. 3A-3C, the global configuration controls 340 include a global image quality slider control 348 that is used to specify the quality of the local display image 152 that is generated for each session 144 included in the user set. The user is able to specify an image quality for all sessions 144 by positioning the slider of the global image quality slider control 348 in a position that corresponds to the desired image quality. Any changes made to a global configuration control are reflected in the corresponding session-specific configuration controls 320 and/or status fields 312. For example, if the user enables compression for all sessions 144 by clicking on the global compression checkbox 346, then each compression checkbox 326 is updated to indicate that the compression is enabled for the corresponding session 144 by checking that checkbox 326.

The button 330, the restart-all button 332 and the global configuration controls 340 enable the user to carry out an operation on all of the sessions 144 included in the user's session set using a single command. For example, the user is able to attempt to open or close all of the sessions 144 in the user's session set or restart all of the open sessions 144 in the user's session set by clicking on the button 330 or by clicking on the restart-all button 332, respectively. Also, the user is able to specify, for example, that the session windows 162 for all of the sessions 144 included in the user's session set should include a border by checking the border checkbox 342 included in the global region 304 of the user interface 160. If the user subsequently wishes that the session window 162 for a particular session 144 not include a border, the user can check the border checkbox 322 associated with that session 144.

The window 302, in the embodiment shown in FIGS. 3A-3C, further comprises an enable command mode radio button 350 and a disable command mode radio button 352. The user is able configure the multiple-session manager 148 to receive and process one or more predetermined key sequences regardless of whether the multiple-session manager 148 is currently the focus of user input (that is, to have the multiple-session manager 148 enter a command mode in response to such hot key sequences) by clicking on or otherwise actuating the enable command mode radio button 350. The user is able to configure the multiple-session manager 148 to not receive and process such hot key sequences (that is, to not have the multiple-session manager 148 enter command mode in response to such hot key sequences) by clicking on or otherwise actuating the disable command mode radio button 352.

The window 302, in the embodiment shown in FIGS. 3A-3C, further comprises a hide button 362 that, when clicked on or otherwise actuated by the user, causes the multiple-session manager 148 to hide the window 302 (that is, to not display the window 302). In one implementation, after hiding the window 302, the user is subsequently able to redisplay the window 302 by inputting a predetermined hot key sequence that causes the multiple-session manager 148 to display the window 302. In another implementation, in addition to or instead of using a predetermined hot key, the user, after hiding the window 302, is subsequently able to cause the multiple-session manager 148 to redisplay the window 302 using a function provided by the underlying operating system 122 (for example, by clicking on an icon associating with the window 302 or by using a system hot key sequence processed by the operating system 122).

The window 302, in the embodiment shown in FIG. 3A-3C, includes an application icon 354 (shown in FIG. 3A) located in the upper left corner of the window 302. When a user clicks on or otherwise actuates the application icon 354, a pop-up menu 356 is displayed (as shown in FIG. 3C). In the embodiment shown in FIGS. 3A-3C, the pop-menu 356 includes a "load session profile" menu item 358 and a "save session profile" menu item 360. When the user selects the load session profile menu item 358, the multiple-session manager 148 retrieves the user's session profile 156 from the directory server 146 for use by the multiple-session manager 148. When the user selects the save session profile menu item 360, the multiple-session manager 148 saves the current configuration information for the user in the user's session profile 156 stored on the directory sever 146.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as erasable programmable read-only memory (EPROM), electrically erasable programmable read-only memory (EEPROM), and flash memory devices; magnetic disks such as internal hard disks and removable disks; magneto-optical disks; and digital video disk (DVD) disks. Any of the foregoing may be supplemented by, or incorporated in, specially-designed application-specific integrated circuits (ASICs).

What is claimed is:

1. A method of managing, at a client device, a plurality of remote computing sessions, the method comprising:
executing a session manager application on the client device, the session manager application comprising a user interface in which configuration information about the plurality of remote computing sessions is displayed, wherein each of the plurality of remote computing sessions is executed on at least one of a set of remote computers, and wherein the configuration information comprises one or more of: compression information, display quality information, border information, and snap information;
causing display of plural distinct session-specific regions in the user interface, wherein the plural regions are associated with corresponding ones of the plurality of remote computing sessions, wherein each of the plural regions includes at least one user-actuatable control element to control a corresponding one of the plurality of remote computing sessions, and wherein each of the plural regions displays the configuration information of the corresponding one of the plurality of remote computing sessions;
receiving, via the user interface of the session manager application, an event associated with an operation, wherein the event is responsive to actuation of the user-actuatable control element in a corresponding one of the plural regions; and
performing the operation on at least one of the plurality of remote computing sessions in response to receiving the event.

2. The method of claim 1, wherein the event is associated with an open operation and wherein performing the operation on at least one of the plurality of remote computing sessions comprises opening one of the plurality of remote computing sessions in response to receiving the open event, wherein the open event is responsive to actuation of the user-actuatable control element in a first one of the plural regions displayed in the user interface, and wherein the first region further displays status information regarding the corresponding opened remote computing session, the status information indicating that the corresponding opened remote computing session is in an open state.

3. The method of claim 2, wherein a second one of the plural regions displays status information indicating that another one of the remote computing sessions is disconnected, wherein the first and second regions are displayed in the user interface simultaneously.

4. The method of claim 3, wherein the status information in each of the first and second regions further contains indication of one or more of a bandwidth of the corresponding remote computing session and a rate at which an image for the corresponding remote computing session is updated at the client device.

5. The method of claim 1, wherein the event is associated with a close operation and wherein performing the operation on at least one of the plurality of remote computing sessions comprises closing one of the plurality of remote computing sessions in response to receiving the close event, wherein the close event is responsive to actuation of the user actuatable control element in one of the plural regions displayed in the user interface.

6. The method of claim 1, wherein the event is associated with a restart operation and wherein performing the operation on at least one of the plurality of remote computing sessions comprises restarting one of the plurality of remote computing sessions in response to receiving the restart event, wherein the restart event is responsive to actuation of the user-actuatable control element in one of the plural regions displayed in the user interface, and wherein the restart event is a Control-Alt-Delete sequence sent to the corresponding one of the remote computers.

7. The method of claim 1, further comprising receiving, at the session manager application, session information about the plurality of remote computing sessions, wherein the session manager application uses the session information in performing the operation.

8. The method of claim 7, further comprising updating the session information for the plurality of remote computing sessions displayed in corresponding ones of the plural regions.

9. The method of claim 1, wherein the user interface of the session manager application comprises a graphical user interface.

10. The method of claim 1, wherein the event comprises a hot-key sequence corresponding to the actuation of the user-actuatable control element in the corresponding one region.

11. The method of claim 1, further comprising causing display of a global region in the user interface, wherein the global region has at least one user-actuatable control element to simultaneously control multiple ones of the plurality of remote computing sessions.

12. The method of claim 11, wherein the user-actuatable control element in the global region is a control element to open all of the plurality of remote computing sessions associated with the client device, the method further comprising:
receiving actuation of the user-actuatable control element in the global region; and
in response to the actuation of the user-actuatable control element in the global region, causing opening of all of the plurality of remote computing sessions associated with the client device.

13. The method of claim 11, further comprising:
causing display of global status information in the global region, wherein the global status information includes an aggregate status of the plurality of remote computing sessions.

14. The method of claim 13, wherein the aggregate status includes one or more of:
a total bandwidth used by the plurality of remote computing sessions, and
an aggregate rate at which images of the respective ones of the plurality of remote computing sessions are updated at the client device.

15. The method of claim 13, wherein the global region further contains a control element actuatable to specify a quality of images of all of the plurality of remote computing sessions, and wherein each of the plural regions further contains a control element actuatable to specify a quality of the image of the corresponding one of the plurality of remote computing sessions.

16. The method of claim 1, wherein the plural distinct session-specific regions are simultaneously displayed.

17. A non-transitory computer-readable storage medium storing a session manager application that comprises program instructions operable to cause a programmable processor of a client device to:
display a user interface for the session manager application;

open a plurality of remote computing sessions in response to an event received via the user interface of the session manger application, wherein plural session windows are generated for displaying local images of respective ones of the plurality of remote computing sessions;

display at least one user-actuatable control element in each of plural distinct session-specific regions in the user interface, wherein each user-actuatable control element in a corresponding one of the plural regions is for opening a corresponding one of the plurality of remote computing sessions;

arrange the session window for each of the plurality of remote computing sessions for display by the client device; and display status information about the plurality of remote computing sessions in respective ones of the plural regions, wherein the status information in a first of the plural regions indicates that a first of the remote computing sessions is connected, wherein the status information in a second of the plural regions indicates that a second of the remote computing sessions is disconnected, and wherein the status information in each of the first and second regions further contains indication of one or more of a bandwidth of a corresponding remote computing session and a rate at which an image for the corresponding remote computing session is updated at the client device.

18. The non-transitory computer-readable storage medium of claim 17, wherein each of the plurality of remote computing sessions is opened on a corresponding at least one of a plurality of remote computers with which the client device communicates.

19. The non-transitory computer-readable storage medium of claim 18, wherein the session manager application further comprises program instructions operable to cause the client device to display configuration information for the plurality of remote computing sessions in the plural regions, wherein the configuration information includes information regarding whether compression is used for communications of the corresponding remote computing session between the client device and the corresponding one of the plurality of remote computers.

20. The non-transitory computer-readable storage medium of claim 19, wherein the session manager application further comprises program instructions operable to cause the client device to receive changes to the configuration information for the plurality of remote computing sessions and update the configuration information displayed for the plurality of remote computing sessions in respective ones of the plural regions based on the received changes to the configuration information for the plurality of remote computing sessions.

21. The non-transitory computer-readable storage medium of claim 17 wherein the session manager application further comprises program instructions operable to cause the client device to:
receive session information about the plurality of remote computing sessions; and
arrange the session window for each of the plurality of remote computing sessions in accordance with the session information.

22. The non-transitory computer-readable storage medium of claim 21, wherein the session manager application further comprises program instructions operable to cause the client device to receive changes to the session information and to save the changes to the session information.

23. The non-transitory computer-readable storage medium of claim 17, wherein the session window for each of the plurality of remote computing sessions is displayed on at least one of a set of display devices coupled to the client device.

24. The computer program product of claim 17, wherein the user-actuatable control element in each of the plural regions is to cause opening or closing of the corresponding one of the plurality of remote computing sessions.

25. The non-transitory computer-readable storage medium of claim 17, wherein the plural distinct session-specific regions are displayed simultaneously in the user interface.

26. The non-transitory computer-readable storage medium of claim 17, wherein the session manager application further comprises program instructions operable to cause the client device to display configuration information relating to the plurality of remote computing sessions in respective ones of the plural regions, wherein the configuration information in each of the plural regions specifies a quality of the local image of the corresponding remote computing session displayed in the corresponding session window.

27. The non-transitory computer-readable storage medium of claim 17, wherein the session manager application further comprises program instructions operable to cause the client device to:
cause display of a global region in the user interface, wherein the global region is separate from the session-specific regions and has at least one user-actuatable control element to simultaneously control multiple ones of the plurality of remote computing sessions; and
cause display of global status information in the global region, wherein the global status information includes an aggregate status of the plurality of remote computing sessions.

28. The non-transitory computer-readable storage medium of claim 27, wherein the aggregate status includes one or more of:
a total bandwidth used by the plurality of remote computing sessions, and
an aggregate rate at which the local images of the respective ones of the plurality of remote computing sessions are updated at the client device.

29. The non-transitory computer-readable storage medium of claim 27, wherein the global region further contains a control element attributable to specify a quality of the local images of all of the plurality of remote computing sessions, and wherein each of the plural session-specific regions further contains a control element attributable to specify a quality of the local image of a corresponding one of the plurality of remote computing sessions.

30. A device, comprising:
a programmable processor;
session manager software that is executable on the programmable processor;
memory communicatively coupled to the programmable processor;
wherein the session manager software is operable to open a plurality of remote computing sessions in response to receiving a unit of user input via a user interface displayed for the session manager software, wherein each of the plurality of remote computing sessions is opened on a corresponding at least one of a set of remote computers; and
wherein the session manager software is further operable to control via the user interface of the session manager software each of the plurality of remote computing sessions, wherein the user interface includes plural displayed session-specific regions that are associated with corresponding ones of the plurality of remote computing sessions, wherein each of the plural displayed regions includes at least one user-actuatable control element that upon actuation is to control a corresponding one of the plurality of remote computing sessions, and wherein each of the plural displayed regions contains status information regarding a corresponding one of the plurality of remote computing sessions, wherein the user interface further includes a global region distinct from the session-specific regions, wherein the global region has at least one user-actuatable control element to simultaneously control multiple ones of the plurality of remote computing sessions, and wherein the session manager software is operable to cause display of global status information in the global region, wherein the global status information includes an aggregate status of the plurality of remote computing sessions, and wherein the aggregate status includes one or more of: a total bandwidth used by the plurality of remote computing sessions, and an aggregate rate at which images of the respective ones of the plurality of remote computing sessions are updated at the device.

31. The device of claim 30, wherein each of the plural displayed regions contains configuration information about corresponding ones of the plurality of remote computing sessions, wherein the configuration information includes one or more of: (1) whether compression is to be used for communications of the corresponding remote computing session between the device and the corresponding remote computer, and (2) a quality of an image of the corresponding remote computing session to be displayed at the device.

32. The device of claim 30, further comprising a network interface to communicatively couple the device to the set of remote computers over a network.

33. The device of claim 30, further comprising a set of display devices communicatively coupled to the device, wherein a session window displaying a local image for each of the remote computing sessions is displayed on a corresponding at least one of the set of display devices.

34. The device of claim 33, wherein the user interface of the session manager software is displayed on at least one of the set of display devices.

35. The device of claim 30, wherein the user-actuatable control element in each of the plural regions is to cause opening or closing of the corresponding one of the plurality of remote computing sessions.

36. The device of claim 30, wherein a first one of the plural displayed regions displays status information indicating that a first of the remote computing sessions is connected, and a second of the plural displayed regions displays status information indicating that a second of the remote computing sessions is disconnected, wherein the first and second displayed regions are to be displayed in the user interface simultaneously.

37. The device of claim 36, wherein the status information in each of the first and second regions further contains indication of one or more of a bandwidth of the corresponding remote computing session and a rate at which an image for the corresponding remote computing session is updated at the client device.

38. The device of claim 30, wherein the plural distinct session-specific regions are displayed simultaneously in the user interface.

* * * * *

UNITED STATES PATENT AND TRADEMARK OFFICE
CERTIFICATE OF CORRECTION

PATENT NO.        : 8,762,540 B2
APPLICATION NO.   : 10/931870
DATED             : June 24, 2014
INVENTOR(S)       : Hochmuth et al.

Page 1 of 1

It is certified that error appears in the above-identified patent and that said Letters Patent is hereby corrected as shown below:

In the Claims

Column 20, line 3, Claim 24, delete "computer program product" and insert -- non-transitory computer-readable storage medium --, therefor.

Column 20, line 56, Claim 30, after "receiving" delete "a unit of".

Signed and Sealed this
Seventh Day of October, 2014

Michelle K. Lee
*Deputy Director of the United States Patent and Trademark Office*